United States Patent
Aldahbaj

(10) Patent No.: US 9,773,386 B2
(45) Date of Patent: Sep. 26, 2017

(54) CHECKOUT-SYSTEM FOR RETAIL

(71) Applicant: Saeed Hamed Aldahbaj, Doha (QA)

(72) Inventor: Saeed Hamed Aldahbaj, Doha (QA)

(*) Notice: Subject to any disclaimer, the term of this patent is extended or adjusted under 35 U.S.C. 154(b) by 0 days.

(21) Appl. No.: 15/094,017

(22) Filed: Apr. 8, 2016

(65) Prior Publication Data

US 2016/0300457 A1    Oct. 13, 2016

(30) Foreign Application Priority Data

Apr. 9, 2015  (EP) ..................................... 15162966

(51) Int. Cl.
| | | |
|---|---|---|
| *G06F 17/00* | (2006.01) | |
| *G07G 1/00* | (2006.01) | |
| *G07G 1/12* | (2006.01) | |
| *G06K 7/14* | (2006.01) | |
| *G06K 19/06* | (2006.01) | |

(52) U.S. Cl.
CPC ......... *G07G 1/0045* (2013.01); *G06K 7/1408* (2013.01); *G06K 19/06037* (2013.01); *G07G 1/009* (2013.01); *G07G 1/0054* (2013.01); *G07G 1/0081* (2013.01); *G07G 1/12* (2013.01)

(58) Field of Classification Search
CPC ......... G06F 17/00; G06F 19/00; G06Q 30/00; G06Q 90/00; G06K 7/00; G06K 7/08; G06K 7/10; G06K 19/00
USPC ... 235/375, 487, 385, 440, 446, 462.01, 470
See application file for complete search history.

(56) References Cited

U.S. PATENT DOCUMENTS

| | | | | |
|---|---|---|---|---|
| 2004/0113791 A1* | 6/2004 | Salim | ................ | G06K 17/0022 340/572.3 |
| 2006/0043175 A1* | 3/2006 | Fu | ........................ | G06Q 20/32 235/383 |
| 2006/0175402 A1* | 8/2006 | Maitin | ................... | G06Q 20/20 235/383 |
| 2006/0266824 A1* | 11/2006 | Hassenbuerger | .... | G07G 1/0054 235/383 |
| 2007/0084918 A1 | 4/2007 | Tabet et al. | | |
| 2007/0182818 A1* | 8/2007 | Buehler | ........... | G08B 13/19602 348/143 |
| 2008/0088450 A1* | 4/2008 | Kwan | ................. | G07G 1/0036 340/572.1 |
| 2012/0284132 A1* | 11/2012 | Kim | ..................... | G07G 1/0081 705/20 |
| 2013/0187778 A1* | 7/2013 | Smith | ................ | G08B 13/2417 340/572.1 |
| 2013/0238471 A1* | 9/2013 | Maraz | ................. | G06Q 10/087 705/28 |
| 2014/0159869 A1* | 6/2014 | Zumsteg | ............... | G06K 7/0004 340/10.1 |
| 2014/0316919 A1* | 10/2014 | Li | ........................ | G06Q 30/06 705/23 |

(Continued)

FOREIGN PATENT DOCUMENTS

EP    0623904 A1    11/1994

*Primary Examiner* — Edwyn Labaze

(74) *Attorney, Agent, or Firm* — Whitham, Curtis & Cook, P.C.

(57) ABSTRACT

A checkout-system for retail is disclosed for secure and comfortable checkout of collected articles, whereby the customer scans the articles with a mobile article scanner by itself, and whereby the checkout-system includes a security system with an RFID scanner to scan RFID-transponder placed on the articles to identify whether all articles bought by the customer were scanned.

8 Claims, 1 Drawing Sheet

(56) References Cited

U.S. PATENT DOCUMENTS

2015/0060543 A1* 3/2015 Bellows ................ G06Q 30/06
235/385

* cited by examiner

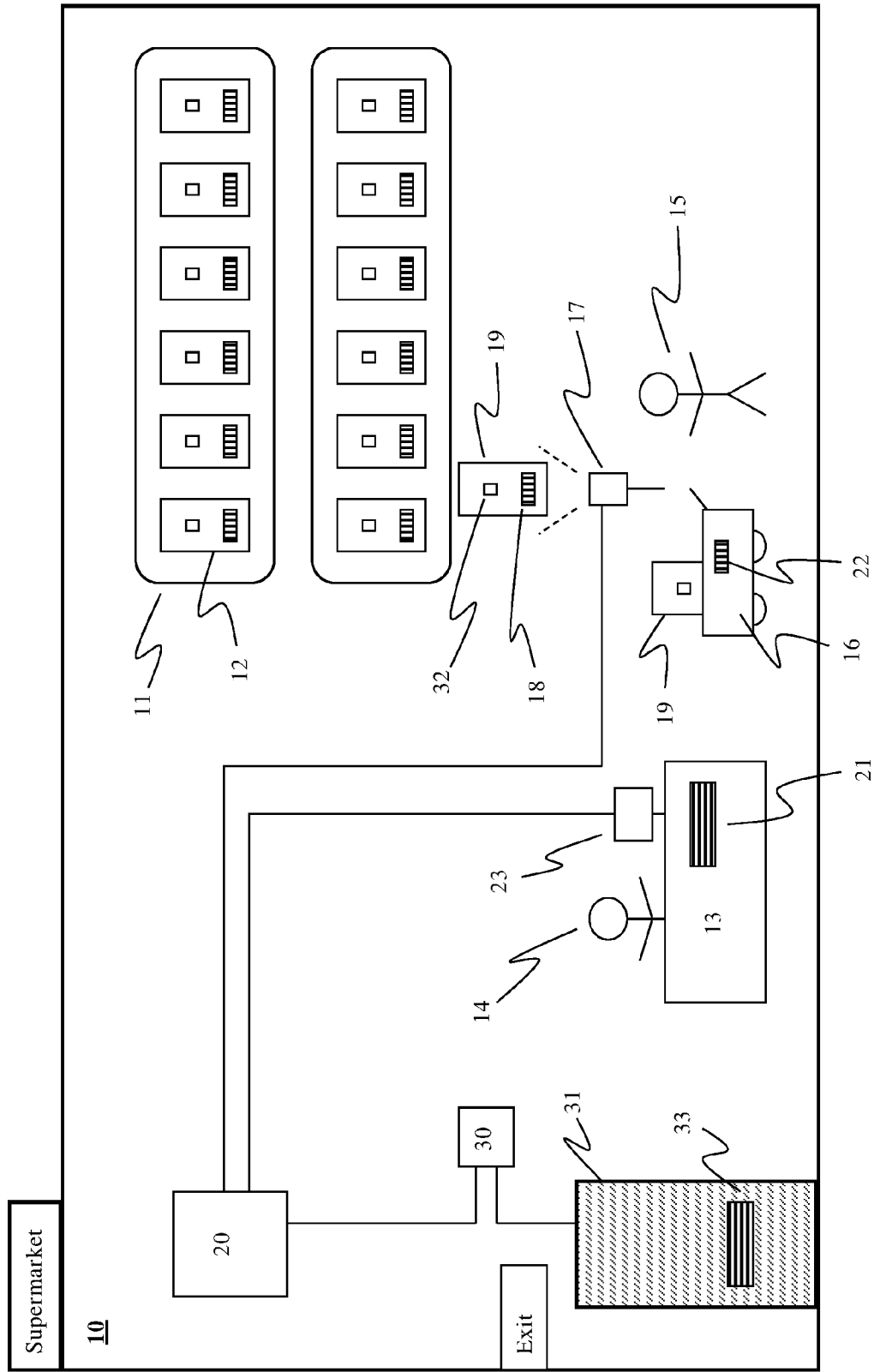

CHECKOUT-SYSTEM FOR RETAIL

FIELD OF THE INVENTION

The invention relates to a checkout-system for retail for secure and comfortable checkout of retail articles collected by customers.

BACKGROUND

In modern retail shops, for example supermarkets, the customers or purchaser collect articles exhibited in the show room before each article is bought by the customer or purchaser. For this, many supermarkets have shopping carts (also called trolley) so that a customer or purchaser could transport the collected articles to a checkout counter. At the checkout counter, the customer or purchaser buy the collected articles by paying the total price of all collected articles. For example, the payment could done in cash or using debit or credit cards.

To calculate the total price of all collected articles of a customer, a cashier of the checkout counter registers each article so that the sum of the price of each registered article is the total price to be paid by the customer. In modern supermarkets, each article is electronically scanned by the cashier using for example a barcode scanner so that each article could identified. Based on the article identification, the price of the scanned article is obtained from a supermarket database.

In the most cases, each article has a machine-readable identification, for example a barcode or a QR-code. This optical machine-readable identification is placed on the articles, especially on the package of the article. On each checkout counter, an optical scanner is arranged for using by the cashier on the checkout counter so that the cashier could scan each article by using the checkout counter scanner for registering each collected article from customer.

However, these well-known checkout procedure in modern supermarkets are very uncomfortable for the customer and the cashier, because each article collected by the customer have to put from the shopping cart on the checkout counters table and each article on the checkout counters table have to scan manually by the cashier at the checkout counter. After scanning, each article have to put from the checkout counters table back to the shopping cart. This is slow and stressful for all person involved in the process.

SUMMARY

It is an object of the present invention to give a new checkout-system for a fast and stressless checkout procedure with a maximum security.

The problem is solved by the new and inventive checkout-system related to claim 1.

Therefore, a new checkout-system for retail for secure and comfortable checkout of collected retail articles is claimed, whereby the checkout-system includes a plurality of mobile article scanner for scanning the retail articles by the customer or purchaser. Each mobile article scanner is arranged to scan machine-readable identifications placed on the articles or the packages of the articles. Such mobile article scanner could be a mobile barcode scanner for scanning a barcode placed on the article or the packages of the article, whereby the machine-readable identification placed on the article could be a barcode or a QR-code, for example an optical scannable code.

These mobile article scanners are arranged for using by customer or purchaser who wants to buy the scanned articles. Therefore, the mobile article scanner are not placed on checkout counters for using by a cashier exclusively. A customer or purchaser takes an article from the supermarket shelf in the supermarket showroom and scan the machine-readable identification, e.g. a barcode, by using the mobile article scanner to scan the taken article. After the scanning process, the customer or purchaser puts the scanned article in his or her shopping cart.

Each mobile article scanner is connected with a register unit of the supermarket, for example via a wireless communication. The register unit is arranged to register each scanned article scanned by the customer using the mobile article scanner of the customer. For this, the mobile article scanner scans the machine-readable identification and transferred the identification to the register unit to register the scanned article. To identify, which registered article was scanned by which customer, the register unit is arranged to assign each scanned article to the customer who has scanned the corresponding article using one of the mobile article scanner. For example, this could be done by assign an identification of the mobile scanner used by the customer to scan the collected articles to the scanned articles, which was scanned by the corresponding mobile scanner. Thereto, a further example is to assign an identification of the shopping cart used by the customer to collect his scanned articles to the scanned articles scanned by the mobile article scanner of said customer.

Furthermore, the inventive checkout-system has one or more checkout counters, whereby each checkout counter is arranged to identify all registered articles scanned by a customer who wants to pay his collected and scanned articles. The checkout counter is connected to the register unit via a communication connection and is arranged to identify all registered articles of the customer, for example based on a distinct identification of the customer, e.g. an identification of the mobile scanner or identification of a shopping cart. Furthermore, the checkout counter has a payment system, which is arranged to pay said identified articles identified from the register unit by said customer who wants to buy his collected articles. The payment system is arranged to pay the identified articles via cash or via credit or debit cart. Further payment procedures are possible, for example to pay via smartphone or near field communication (NFC).

Furthermore, the checkout-system of the present invention includes a security system to raise the security in regard to shoplifting. Because with the inventive checkout-system, it is more easily to not pay some articles by not scanning these articles. Therefore, a security system is arranged in the supermarket including one or more RFID scanner for scanning RFID transponder placed on the articles. In fact, there is a distinction between the machine-readable identifications arranged to scan by the mobile article scanner and the RFID transponder arranged to scan by RFID scanner.

The security system, furthermore, is arranged to identify all collected articles by scanning the RFID transponders on the collected articles, so that the security system knows all about the collected articles. For example, these collected articles are put in the shopping cart and the security system identifies all articles in the shopping cart or near a customer by scanning all RFID-transponders of the articles by the RFID scanner. The RFID scanner could arranged on the exit of the supermarket.

Furthermore, the security system is arranged to identify all registered articles scanned by said customer from said register unit, for example by scanning a customer identification (identification of the mobile article scanner or an identification of the shopping cart). At this time, the security system knows all collected articles scanned by the RFID-transponder and knows all registered articles scanned by the customer. The security system compares each other and trigger an alarm if at least one identified collected article is not included in the identified registered articles. In this case, the customer do not pay at least one of the collected articles, because the customer did not scan the missing article.

With the present invention, it is possible to reduce to overhead on the checkout counter, because the customers scan and register the articles by itself. Furthermore, with the present invention it is possible to raise the security in the case of these self-service checkout procedures without to increase rapidly the costs of such systems.

Regarding to an embodiment, the one or more RFID scanner of the security system are positioned before and/or behind of said one or more checkout counters. Preferably, the RFID scanner or the security system are positioned behind of the one or more checkout counters, for example in an exit zone of the supermarket.

In a further embodiment, the numbers of RFID scanner are less than the numbers of checkout counters.

In a further embodiment, each mobile article scanner is an optical scanner, especially an optical barcode scanner and said machine-readable identifications are optical machine-readable identifications especially barcode or QR-code identifications.

In a further embodiment, the inventive checkout-system includes a plurality of shopping carts, each shopping cart has a machine-readable identification to identify each shopping cart. At first, the one or more checkout counters have a shopping cart scanner to scan said machine-readable identification placed on the shopping cart, so that the one or more checkout counter could identify all registered articles scanned by said customer based on the scanned machine-readable identification of said scanned shopping cart. In the register unit, each article scanned by the customers of the supermarket are assigned to a corresponding identification of the shopping cart used by the corresponding customer to identify each scanned article scanned by a customer by using the identification of the shopping cart.

At second, the security assistant includes furthermore a shopping cart scanner to scan said machine-readable identification placed on the shopping cart so that also the security system could identify all registered articles scanned by the customer of the shopping cart by using the shopping cart identification. This is necessary to compare the collected articles scanned by the RFID-transponder and the registered articles scanned by the customer itself.

In other words, the shopping cart identification is an identification to identify each shopping cart and to assign all scanned articles to a precise shopping cart used by the customer who scanned the scanned and registered articles.

Preferably, the machine-readable identifications based on the shopping cart are optical machine-readable identifications, especially barcode identifications, and said shopping cart scanner is an optical scanner, especially an optical barcode scanner. Furthermore, the machine-readable identification placed on the shopping cart could be a RFID-transponder and said shopping cart scanner is an RFID scanner.

In a further embodiment, the one or more checkout counters and/or the security system are arranged to identify the mobile article scanners used by customers for scanning articles to identify the articles scanned by the corresponding mobile scanner. For this, each mobile article scanner has a machine-readable identification to identify each mobile article scanner so that each article scanned with a mobile article scanner is assigned to the identification (ID) of the corresponding mobile article scanner, which scans the assigned article. Therefore, the one or more checkout counters and/or the security system are arranged to identify all registered articles scanned by a customer using the corresponding mobile article scanner based on the identification of the mobile article scanner.

Preferably, the mobile article scanners are placed on the shopping cart.

BRIEF DESCRIPTION OF THE DRAWING

The present invention is described in more detail by reference to the following FIGURE:

FIG. 1—schematic depiction of the inventive checkout-system

DETAILED DESCRIPTION

FIG. 1 shows the inventive checkout-system 10 included in a supermarket for retail products. The supermarket has a plurality of shelves 11, in which the retail products 12, called articles, are stored. The shelves 11 are placed in the showroom of the supermarket.

Further, the supermarket has a plurality of checkout counters 13 (only one is shown) whereby on the checkout counter 13 is sitting a cashier 14 to assist a customer or purchaser 15 during the payment procedure of the collected articles.

Furthermore, the supermarket has a plurality of shopping carts 16 for using by a customer 15 so that the customer 15 could transport the collected articles from the shelves 11 to the checkout counter 13. Therefore, a customer 15 takes the wanted articles from the shelves 11 and put it in the shopping cart 16 for transporting.

Based on the present invention, the checkout-system 10 has a plurality of mobile article scanner 17 arranged for using by a customer 15. Each presented article 12 in the shelves 11 have a machine-readable identification in the form of a barcode 18, whereby the mobile article scanner 17 is arranged to scan the barcode 18 and to determine a distinct identification of the scanned article based on the scan procedure.

For example, if a customer 15 enter the supermarket, the customer get a mobile article scanner 17 for its own use. If a customer 15 wants an article 12, the customer takes the wanted articles from the shelves 11 and scans the barcode 18 on the taken articles by the mobile article scanner 17. After scanning, the customer 15 puts the scanned articles in its shopping cart 16 (scanned article in shopping cart 19).

Each mobile article scanner 17 is, furthermore, connected with a register unit 20, which could be a computer or a server system. The connection between the mobile article scanner 17 and the register unit 20 is preferably wireless, for example via WLAN, GSM or near field communication.

If a customer 15 scans a barcode 18 of an article 12 with its mobile article scanner 17, the mobile article scanner 17 determines the distinct identification of the article 12 from the scanned barcode 18 and transferred this digital identification to the register unit 20 to register a scanned article for the customer 15. Each scanned and registered article in the register unit 20 is assigned to the customer 15 who has scanned this corresponding article using the mobile article scanner 17. For this purpose, the customer 15 is identified by an ID, for example an ID of the mobile article scanner 17 or an ID of the shopping cart 16 used by the customer 15. This customer ID and the identification of the scanned article is transferred to the register unit to register the scanned article in conjunction to the customer who has scanned the article.

For checkout, the customer 15 goes with its shopping cart 16 to one of the checkout counter 13. The checkout counter 13 is arranged to identify all registered articles scanned by the customer 15. For this purpose, the checkout counter 13 has for example a shopping cart scanner 21 used by the cashier 14. With the shopping cart scanner 21, the cashier 14 scans a machine-readable identification 22 placed on the shopping cart 16. This machine-readable identification 22 of the shopping cart 16 could be also a barcode.

Based on the distinct identification of the shopping cart 16, the checkout counter 13 identifies all scanned and registered articles, which are assigned to the scanned identification of the shopping cart 16. Therefore, the checkout counter 13 is connected to the register unit 20.

After all registered articles are identified, the customer 15 is paying the scanned and registered articles via cash or for example via credit or debit cart. Therefore, the checkout counter 13 has a payment system 23 so that the customer 15 could pay its articles.

Behind of the checkout counters 13 in the vicinity of the exit of the supermarket a security system 30 is installed, which includes one or more RFID scanner 31. The security system 30 is connected with the register unit 20 and with the RFID scanner 31.

On each article 12, furthermore, is placed an RFID-transponder 32 to detect or identify the article 12 via RFID scanner 31. In the broadest meaning, it is necessary that the RFID scanner 31 counts the quantity of collected articles 19 in the shopping cart 16 if the customer 15 is in the vicinity of the RFID scanner 31 in direction to the exit of the supermarket. To identify the collected articles by scanning the RFID-transponders of the collected articles via RFID scanner 31 means in the broadest meaning that the quantity of the articles in the shopping cart 16 is counted.

Furthermore, in FIG. 1, the RFID scanner has a shopping cart scanner 33 to scan the shopping cart barcode 22 placed on the shopping cart 16, if a customer 15 pushes the shopping cart 16 through the RFID scanner 31. The shopping cart scanner 33 scans the shopping cart barcode 22 and detect the distinct identification of the shopping cart 16. Based on the distinct identification of the shopping cart 16, the security system 30 identifies all registered articles assigned to the shopping cart identification of the shopping cart 16.

The security system 30 compares the identified registered articles delivered from the register unit 20 and the scanned articles scanned by the RFID scanner 31 and is arranged to trigger an alarm if at least one identified collected article in the shopping cart 16 is not included in the identified registered articles. In this case, the customer forgot to scan an article before he put the article in the shopping cart 16.

I claim:

1. A checkout-system for retail for secure and comfortable checkout of collected articles, comprising:
 a plurality of mobile article scanners, wherein each mobile article scanner is arranged to scan machine-readable identifications placed on articles, wherein each mobile article scanner is arranged for use by a customer who wants to buy the scanned articles, wherein each mobile article scanner is an optical scanner and said machine-readable identifications are optical machine-readable identifications;
 a register unit arranged to register each scanned article scanned by said customer using one of said mobile article scanners, wherein said register unit is arranged to assign each scanned article to said customer who has scanned the corresponding article using one of said mobile article scanners;
 one or more checkout counters, wherein each checkout counter is arranged to identify all registered articles scanned by said customer from said register unit, wherein each checkout counter has a payment system for paying said identified articles by said customer who wants to buy said identified articles; and
 a security system including one or more RFID-scanners for scanning RFID-transponders placed on articles, wherein said security system is configured to
  identify all collected articles by scanning said RFID-transponders of said collected articles, said collected articles being collected from said customer who wants to buy or bought said collected articles,
  identify all registered articles scanned by said customer from said register unit, and
  trigger an alarm if at least one identified collected article is not included in said identified registered articles
 wherein said one or more RFID-scanners are positioned behind said one or more checkout counters.

2. The checkout-system according to claim 1, wherein each mobile article scanner is an optical barcode scanner and said machine-readable identifications are barcode identifications.

3. The checkout-system according to claim 1, further comprising a plurality of shopping carts, wherein each shopping cart has a machine-readable identification to identify each shopping cart, and wherein said checkout-system is characterized by one or more of the following:
 said one or more checkout counters have a shopping cart scanner to scan said machine-readable identifications placed on the shopping carts, wherein said one or more checkout counters are arranged to identify all registered articles scanned by said customer using a scanned shopping cart based on the scanned machine-readable identification of said scanned shopping cart; and
 said security system includes a shopping cart scanner to scan said machine-readable identifications placed on the shopping carts, wherein said security system is arranged to identify all registered articles scanned by said customer using a scanned shopping cart based on the scanned machine-readable identification of said scanned shopping cart.

4. The checkout-system according to claim 3, wherein the machine-readable identifications placed on each shopping cart are optical machine-readable identifications and said shopping cart scanner is an optical scanner.

5. The checkout-system according to claim 3, wherein the machine-readable identifications placed on each shopping cart are barcode identifications and said shopping cart scanner is an optical barcode scanner.

6. The checkout-system according to claim 3, wherein the machine-readable identifications placed on each shopping cart are RFID-transponders and said shopping cart scanner is a RFID-scanner.

7. The checkout-system according to claim 3, wherein one or more of said one or more checkout counters and said security system are configured to identify said mobile article scanners used by customers for scanning articles and to identify all registered articles scanned by a customer using a mobile article scanner based on an identification of said mobile article scanner.

8. The checkout-system according to claim 3, wherein said mobile article scanners are placed on shopping carts.

* * * * *